United States Patent
Cerul

(10) Patent No.: US 6,901,628 B2
(45) Date of Patent: Jun. 7, 2005

(54) PROTECTOR SLEEVE

(76) Inventor: Alexis Cerul, 551 E. Empire St, San Jose, CA (US) 95112

(*) Notice: Subject to any disclaimer, the term of this patent is extended or adjusted under 35 U.S.C. 154(b) by 0 days.

(21) Appl. No.: 10/872,796

(22) Filed: Jun. 21, 2004

(65) Prior Publication Data

US 2004/0226131 A1 Nov. 18, 2004

Related U.S. Application Data

(63) Continuation-in-part of application No. 10/084,210, filed on Feb. 28, 2002, now Pat. No. 6,779,232.

(51) Int. Cl.[7] .................................................. F16L 5/00
(52) U.S. Cl. ........................................ 16/2.1; 174/153 G
(58) Field of Search ............................. 16/2.1, 2.2, 2.5; 24/713.6; 227/55; 174/152 R, 153 G, 154, 83, 167, 158 R, 158 F, 152 G; 217/98, 106, 113; 411/173–175, 177, 181, 113, 179

(56) References Cited

U.S. PATENT DOCUMENTS

| | | | | |
|---|---|---|---|---|
| 568,687 A | * | 9/1896 | Kempshall | 16/2.1 |
| 1,080,257 A | * | 12/1913 | Bruchsaler | 174/153 G |
| 2,901,800 A | * | 9/1959 | Koehl | 24/713.7 |
| 4,930,733 A | * | 6/1990 | Logsdon | 248/56 |
| 5,118,057 A | * | 6/1992 | Martin et al. | 248/56 |
| 5,238,344 A | * | 8/1993 | Nagayama | 411/183 |
| D375,250 S | * | 11/1996 | Dollins | D8/356 |
| 6,099,527 A | * | 8/2000 | Hochschuler et al. | 606/61 |
| 6,139,237 A | * | 10/2000 | Nagayama | 411/181 |

FOREIGN PATENT DOCUMENTS

JP        53-072194    * 6/1978

* cited by examiner

*Primary Examiner*—Jack Lavinder
*Assistant Examiner*—Andre' L. Jackson

(57) ABSTRACT

The Protector Sleeve is a grommet, preferably cylindrical or rectangular, made of steel, that would be located in a hole drilled through a stud or joist in wood frame construction. It has anchors on both sides to keep it in place. The anchors, short strips of metal attached to the body, which are bent 90 degrees and can have barbs, or holes for a fastener (nail/screw/tack), will allow the body of the grommet to rest or be suspended in the hole drilled in the stud. When the Protector Sleeve is in place it shields the interior of the hole that was drilled, thereby protecting the wire or pipe that the hole was drilled for from being punctured by any screw or nail that might be driven through the wall and into the stud. The steel of the Protector Sleeve either stops, or deflects, the nail or screw.

7 Claims, 10 Drawing Sheets

PROTECTOR SLEEVE

CROSS-REFERENCE TO RELATED APPLICATION

This specification discloses some subject matter common to that disclosed and claimed in the Alexis Cerul application titled "Protector Sleeve For Wires And Pipes In Wood Frame Construction" filed Feb. 28, 2002, and numbered Ser. No. 10/084,210, and is, therefore, a continuation in part of said application Ser. No. 10/084,210 now U.S. Pat. No. 6,779,232 which I request be herein incorporated by reference.

STATEMENT REGARDING FEDERALLY SPONSORED RESEARCH OR DEVELOPMENT

Not applicable.

REFERENCE TO SEQUENCE LISTING, A TABLE OR A COMPUTER PROGRAM LISTING COMPACT DISC APPENDIX

Not applicable.

BACKGROUND OF THE INVENTION

From a consideration of the cross referenced application Ser. No. 10/084,210, it will be apparent that it primarily pertains to devices that protect wires or pipes from being punctured, ruptured, or otherwise compromised, by nails, screws, or other fasteners, that would be driven into the walls, ceilings, or floors of buildings and other structures constructed by means of wood studs and joists. For example, when a house is built with wood studs there must be holes drilled in those studs so that wires and pipes can reach their final destination. Once the drywall or paneling is attached to the studs one cannot see where the wires or pipes are and one runs the risk of compromising them when hanging or attaching things to the wall, at the point of the studs, with screws or nails that might need to be several inches long to support their load and serve their function.

application Ser. No. 10/084,210 presents, for the reasons disclosed therein, an improvement over the prior state of the art "protector plate" and this application discloses variations and improvements over that one in several ways. First, this new Protector Sleeve does not fit snugly against the walls of the hole drilled in the stud. Rather it hangs, or rests, loosely in that area. It is kept in place, or suspended, by the anchors on either side of the body. This allows for an easier installation. With this new Protector Sleeve it is not necessary that there be a precise fit between the hole and the body. As the new Protector Sleeve hangs or rests in the hole drilled through the stud it is able to prevent puncture or rupture of a wire or pipe not only by providing an impenetrable barrier but also by means of deflecting a nail or screw that would come its way. In this regard the Protector Sleeve does not even need to be round and instead could be a piece of square tubing orientated so as to present one of its four corners (thus appearing diamond shaped) to the nail or screw being driven horizontally. Furthermore, this new design allows for an easier and more economical production process. This modified design more readily lends itself to being produced by taking the shape from a sheet of steel and rolling it into its final shape. The edges need only roughly match up, and may even substantially overlap, as long as they meet at the top or bottom of the Protector Sleeve. Since a nail or screw will come through a stud substantially horizontally, the Protector Sleeve's seam or connection will be safe from compromise if located at the top or bottom and not at a point where a nail or screw would enter.

Finally, since this modified Protector Sleeve is smaller than that previously disclosed there will be a materials savings that becomes substantial when thousands of units are produced.

BRIEF SUMMARY OF THE INVENTION

The Protector Sleeve is a grommet, preferably cylindrical or rectangular, made of steel, that would be located in a hole drilled through a stud or joist in wood frame construction. It has anchors on both sides to keep it in place. The anchors, short strips of metal attached to the body, which are bent 90 degrees and can have barbs, or holes for a fastener (nail/screw/tack), will allow the body of the grommet to rest or be suspended in the hole drilled in the stud. When the Protector Sleeve is in place it shields the interior of the hole that was drilled, thereby protecting the wire or pipe that the hole was drilled for from being punctured by any screw or nail that might be driven through the wall and into the stud. The steel of the Protector Sleeve either stops, or deflects, the nail or screw.

FIGURE LEGEND

Figure 1:
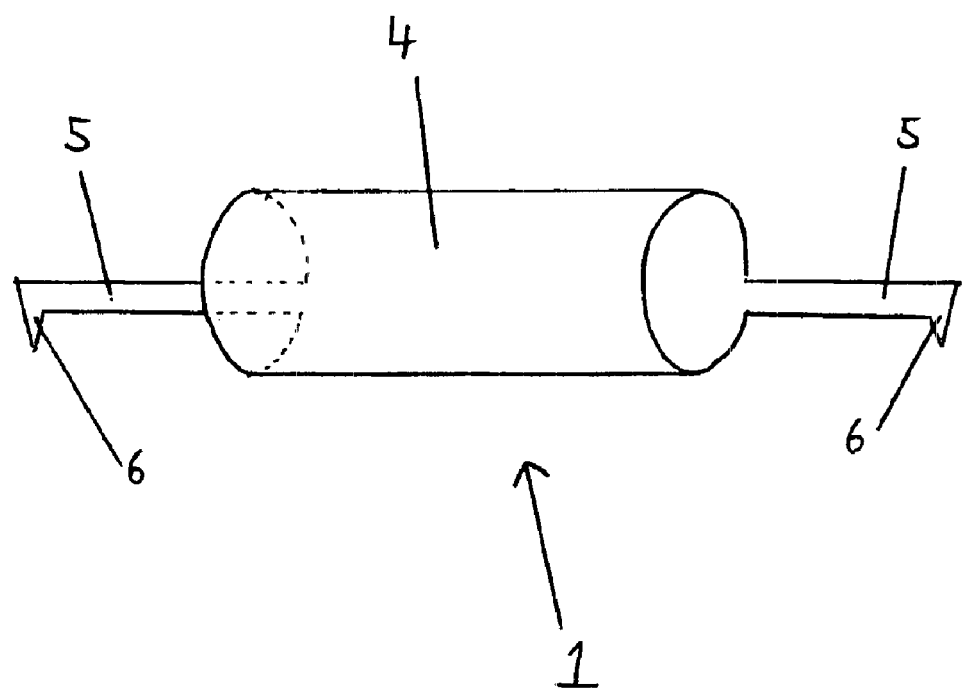
FIG. 1 is a cylindrical Protector Sleeve, with interchangeable anchors, utilizing barbs or spikes, in final form.
Figure 2:
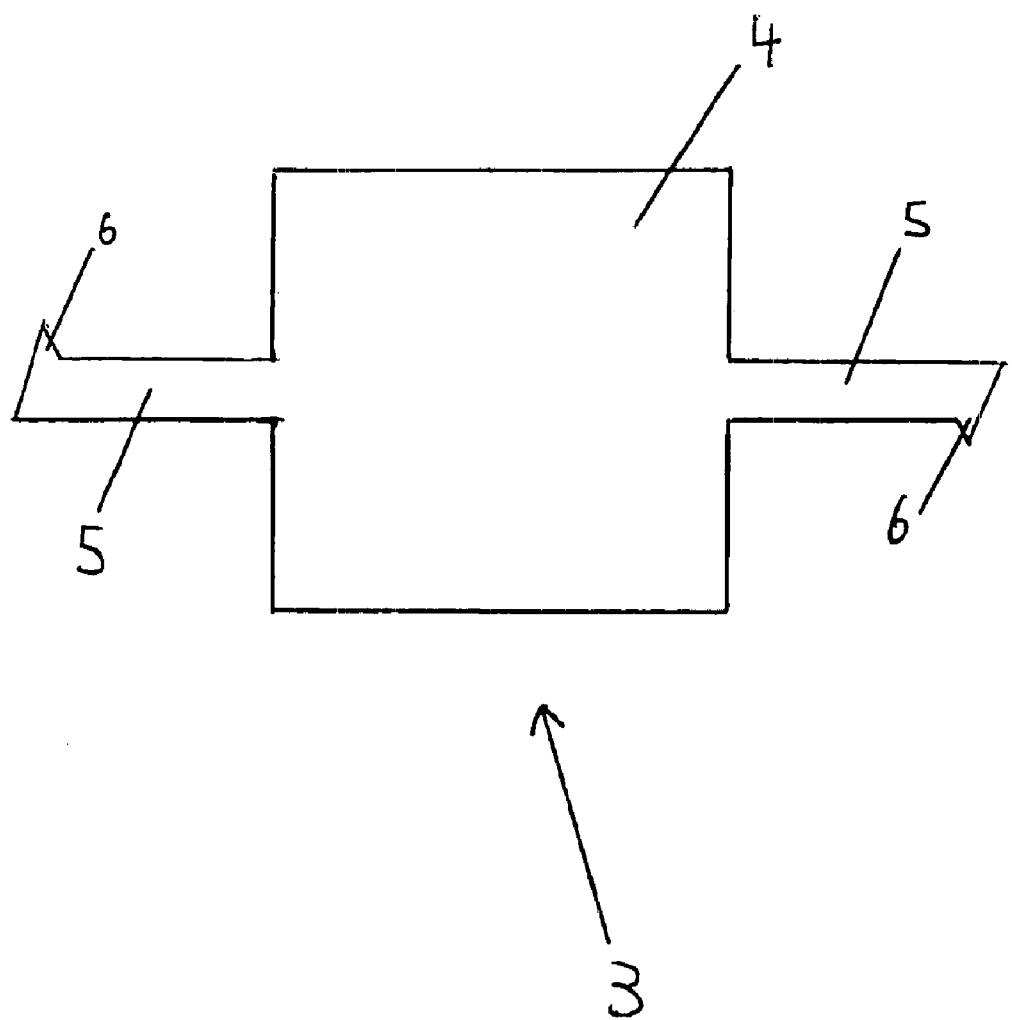
FIG. 2 is a cylindrical Protector Sleeve, with interchangeable anchors, utilizing barbs or spikes, prior to being rolled into form such that the ends butt together.
Figure 3:
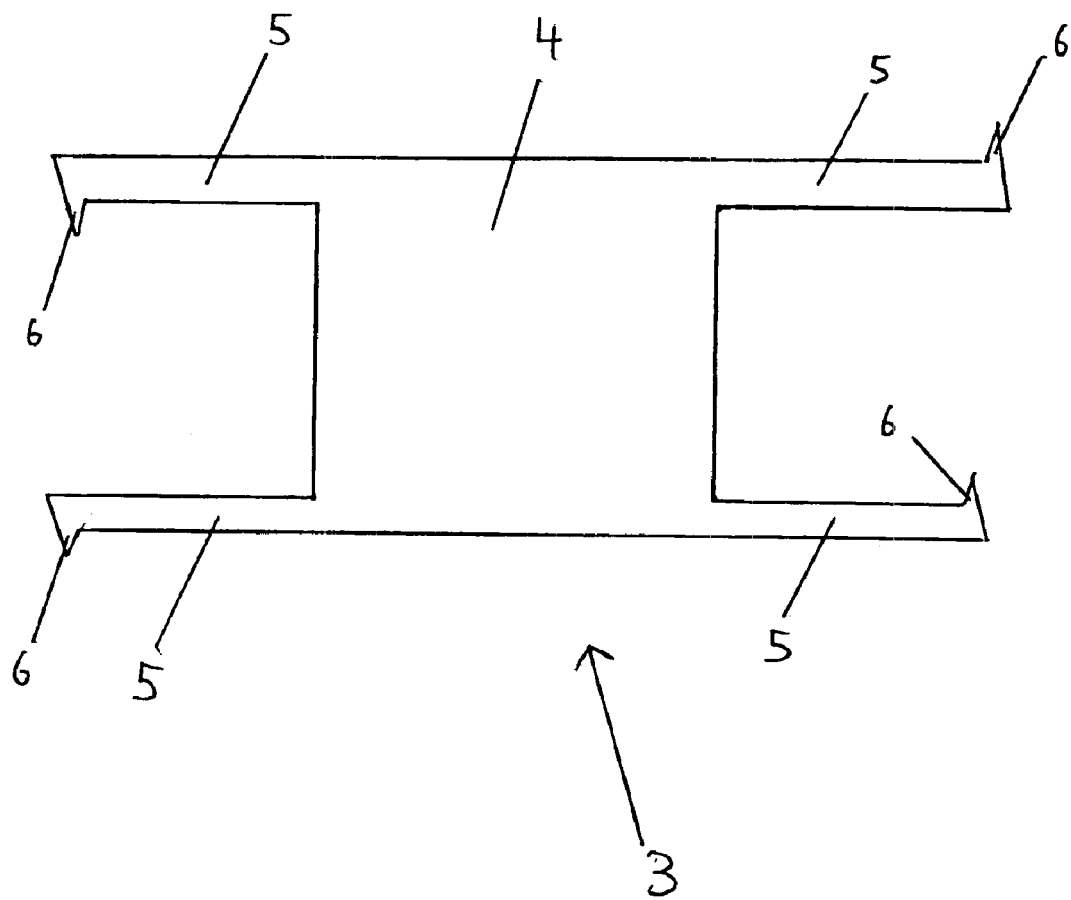
FIG. 3 is a cylindrical Protector Sleeve, with interchangeable anchors, utilizing barbs or spikes, prior to being rolled into form such that the ends overlap such that the anchors are directly on top of each other.
Figure 4:
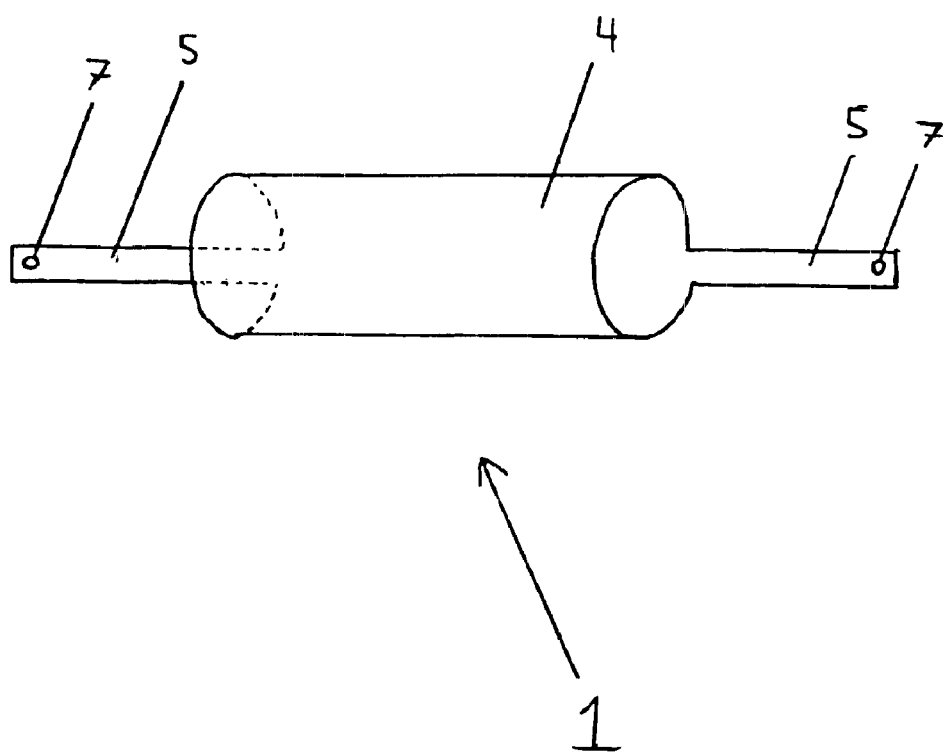
FIG. 4 is a cylindrical Protector Sleeve, with interchangeable anchors, utilizing a hole in the anchor for the insertion of a nail or screw type fastener, in final form.
Figure 5:
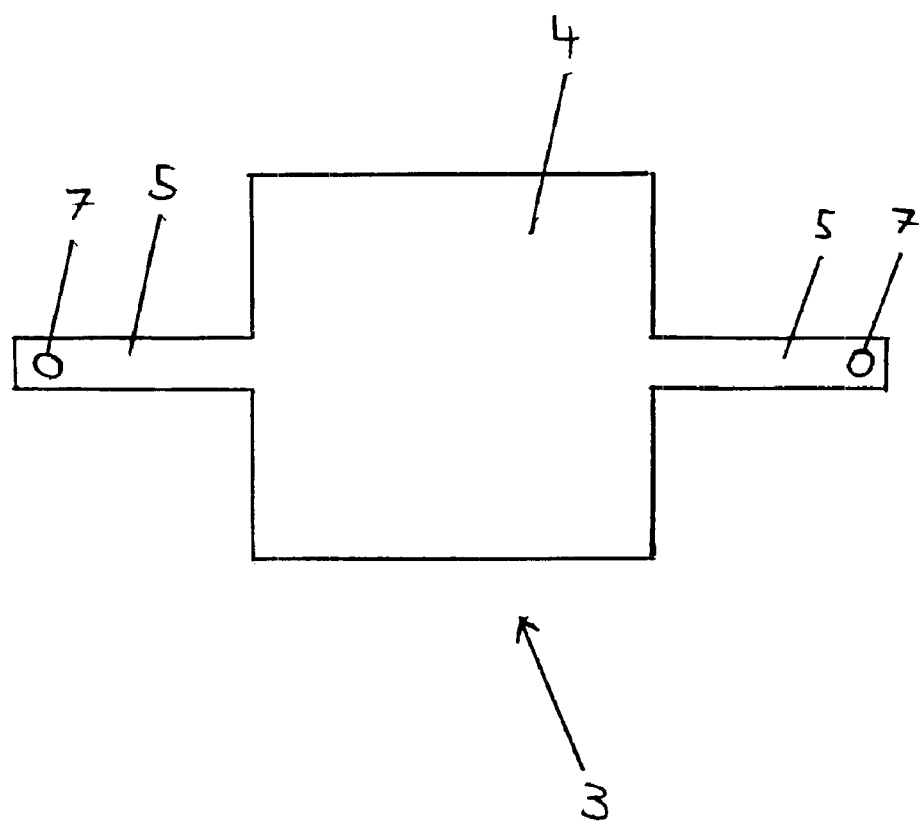
FIG. 5 is a cylindrical Protector Sleeve, with interchangeable anchors, utilizing a hole in the anchor for the insertion of a nail or screw type fastener, prior to being rolled into form such that the ends butt together.
Figure 6:
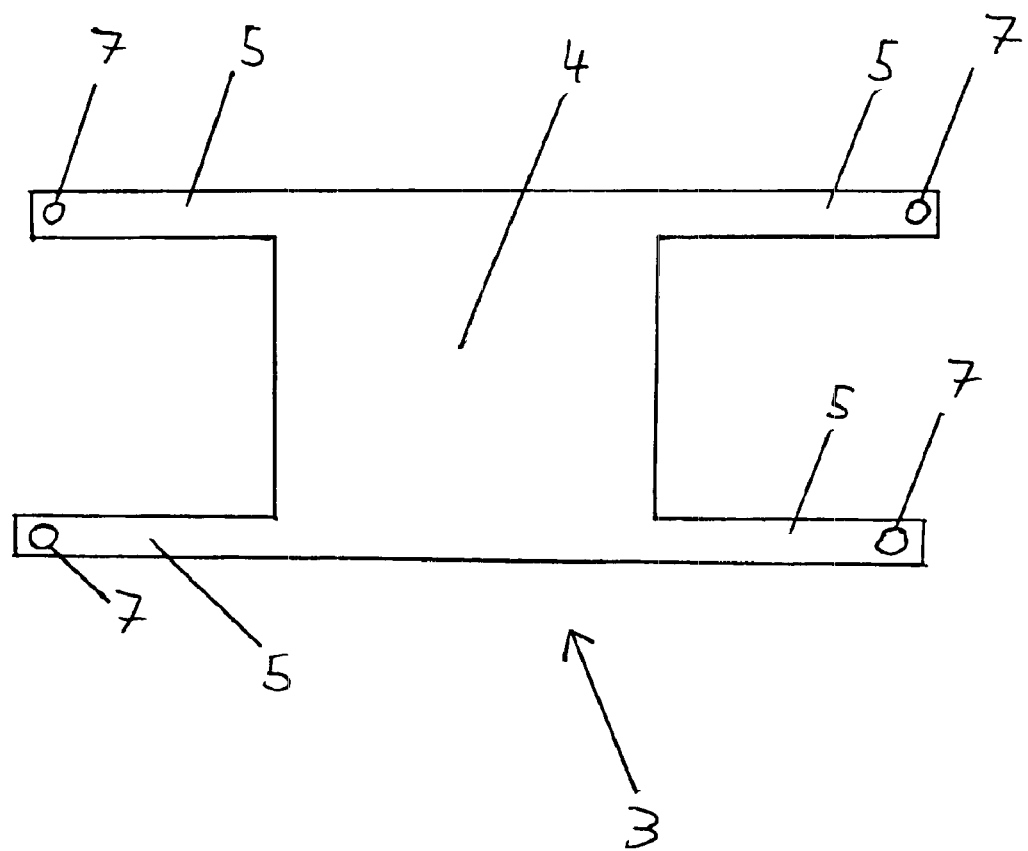
FIG. 6 is a cylindrical Protector Sleeve, with interchangeable anchors, utilizing a hole in the anchor for the insertion of a nail or screw type fastener, prior to being rolled into form such that the ends overlap so that the anchors are directly on top of each other.
Figure 7:
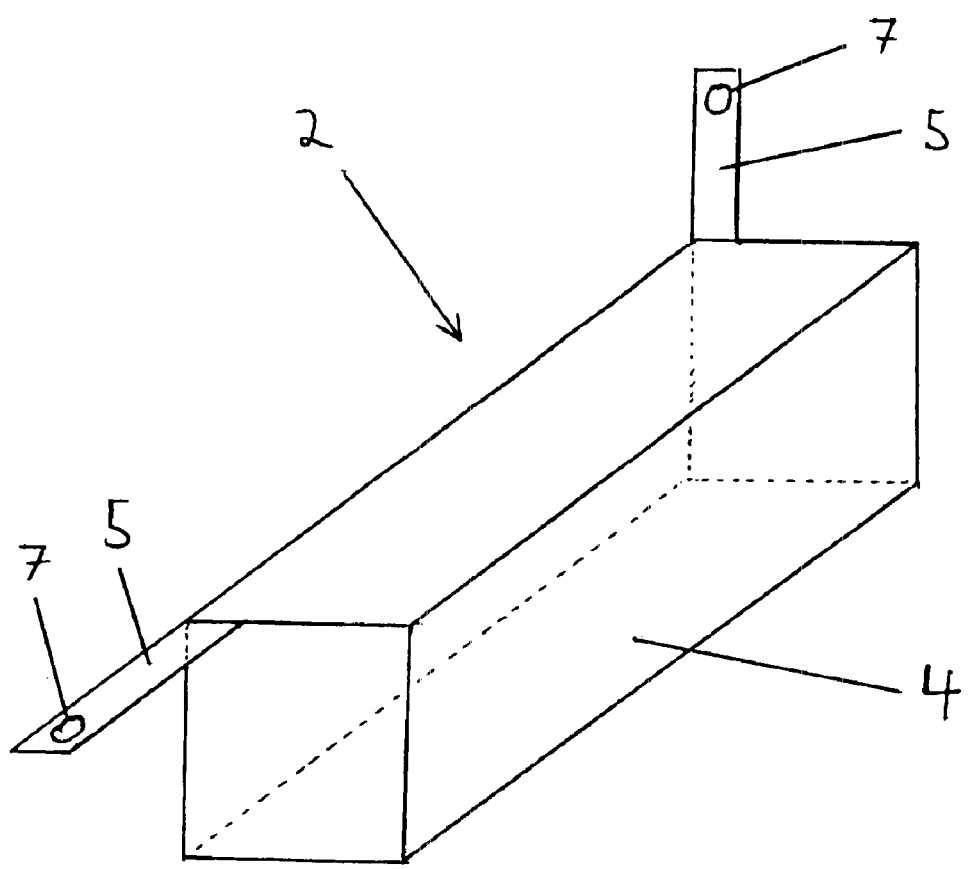
FIG. 7 is a Protector Sleeve with a square/rectangular body, with interchangeable anchors, utilizing a hole in the anchor for the insertion of a nail or screw type fastener, in final form.
Figure 8:
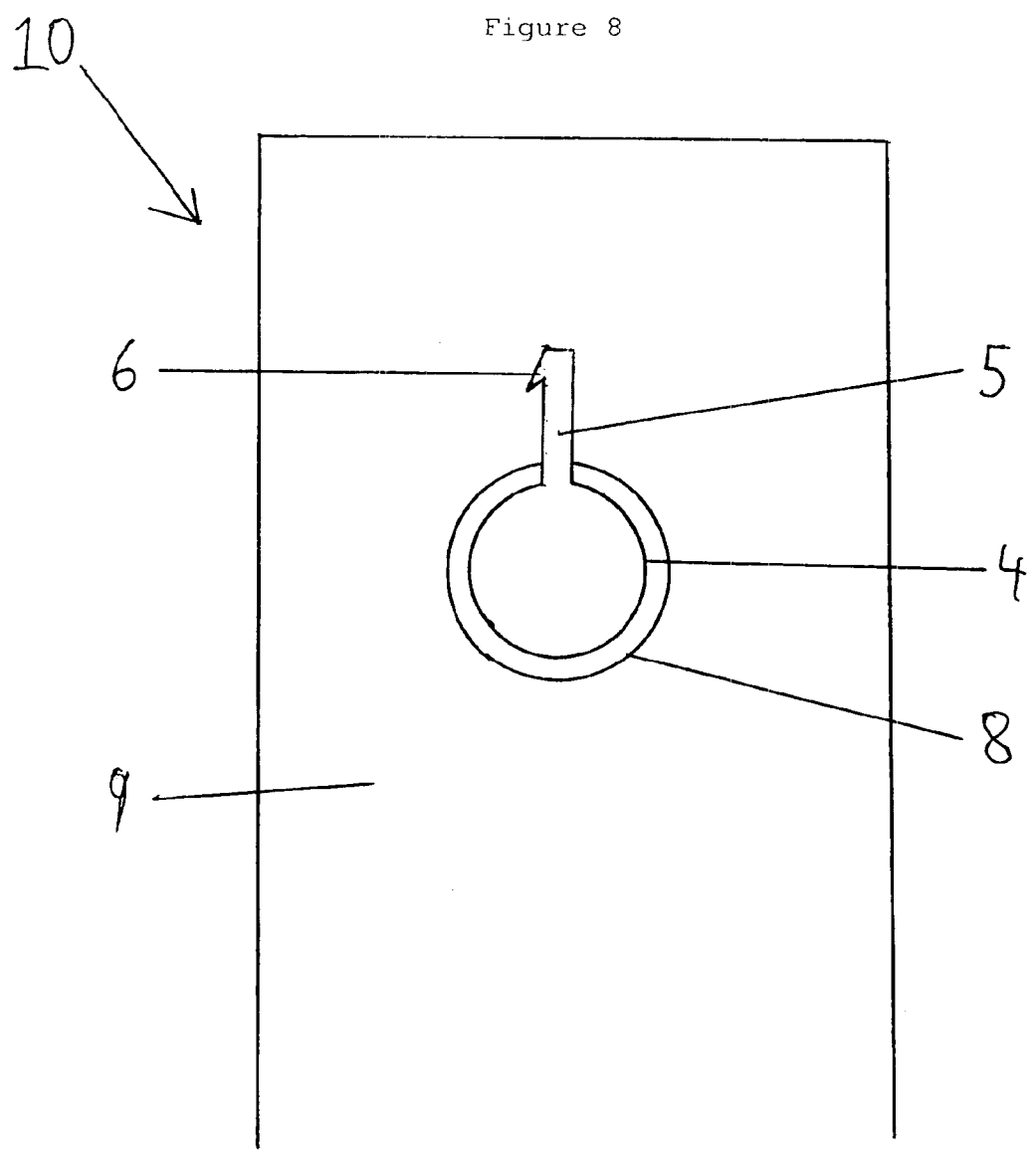
FIG. 8 is a Protector Sleeve, with anchor utilizing a barb or spike that digs into the wood, installed in a wood stud such that it is suspended in the hole.
Figure 9:
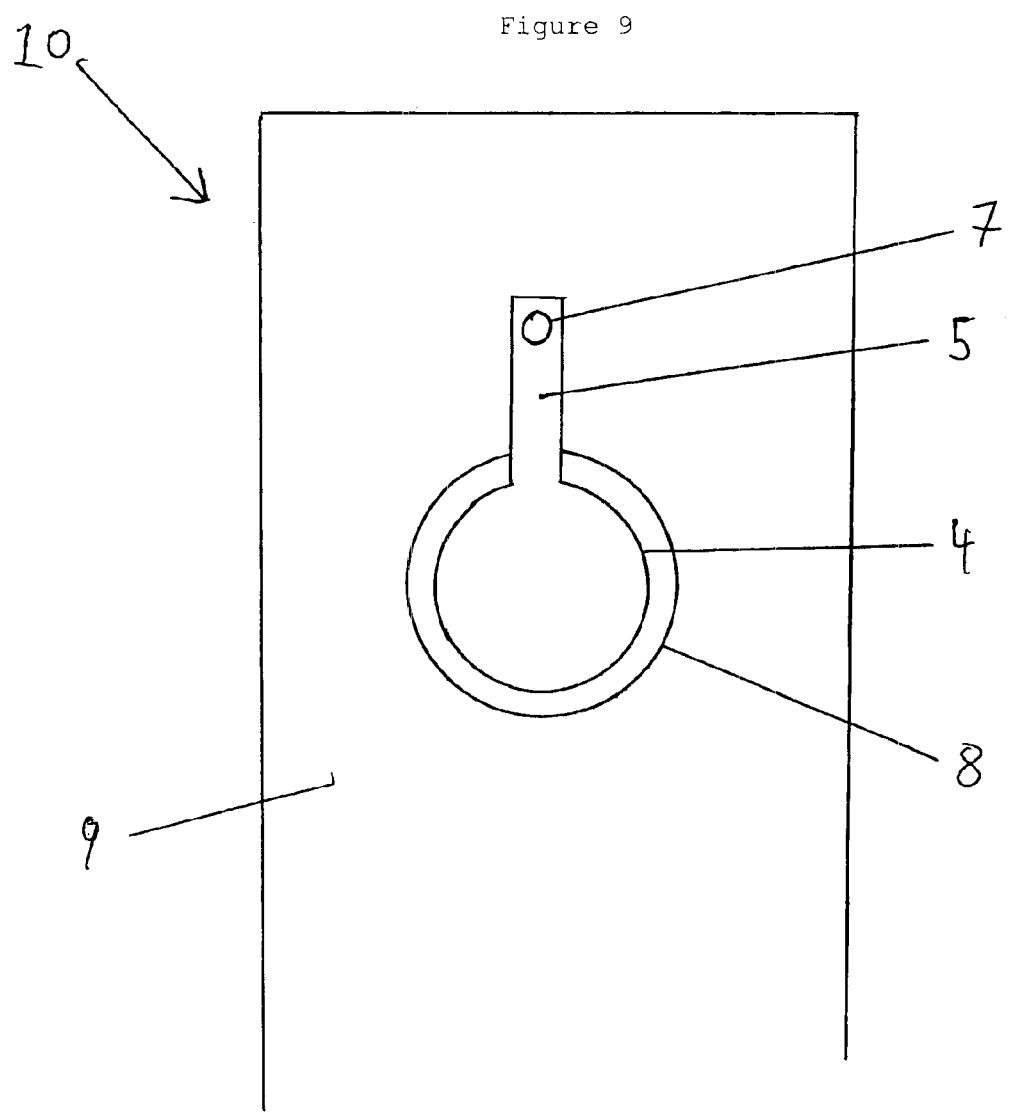
FIG. 9 is a Protector Sleeve, with anchor utilizing a hole for the insertion of a nail or screw type fastener, installed in a wood stud such that it is suspended in the hole.

1: A cylindrical variation of the Protector Sleeve.
2: A variation of the Protector Sleeve made with square tubing.

3: A cylindrical variation of the Protector Sleeve cut from a sheet of steel and before being rolled into final form.
4: The body of the Protector Sleeve.
5: An anchor, initial or final, of the Protector Sleeve.
6: The spike/barb portion of an anchor.
7: Hole in anchor for use of a fastener (nail or screw) to attach anchor to wood.
8: A typical hole drilled in a wood framing stud or joist.
9: A typical wood two inch by four inch stud.
10: The Protector Sleeve installed in a typical wood stud.

DETAILED DESCRIPTION OF THE INVENTION

The objective of the invention is to provide a convenient device that acts like a shield, or a coat of armor, around a wire or pipe so that there is no risk of the wire or pipe being damaged by anything that might be driven into the wall, ceiling or floor. In wood frame construction, studs 9 and joists usually present a two inch side and are sixteen inches apart. Wires and pipes run through the walls, ceilings and floors and pass through the studs 9 or joists by means of holes 8 drilled in those studs 9 or joists. Therefore, behind such walls there are large voids of space between the studs 9. When somebody wants to hang or attach something to the wall they will seek to drive the fastener through the wall material and into the stud 9. This is because the wood of the stud 9 provides substantial strength and support whereas the relatively thin wall material might not be strong enough and is certainly less desirable for this purpose. If, by stroke of bad luck, the nail or screw goes into the stud 9 at the point where there is a hole 8 with a wire or pipe going through it, the nail or screw, if long enough, can enter the hole 8 and pinch the wire or pipe against the other side of the hole 8, and then possibly penetrate it, thereby creating a dangerous, or at least undesirable, situation.

The body 4 of the Protector Sleeve 1 is its operative component and it amounts to a hollow tube of steel as long as the depth of the hole 8 drilled in the stud 9. The Protector Sleeve 1 should be inserted into the hole 8 prior to placement of the wire or pipe and the wire or pipe should pass through the center of the steel tube. Thus installed, the Protector Sleeve 1 serves as a shield, or armor, defending the wire or pipe from everything around it. Particularly, the steel protects the wire or pipe from nails or screws penetrating the wood stud 9 and coming towards its location.

Figure 10:
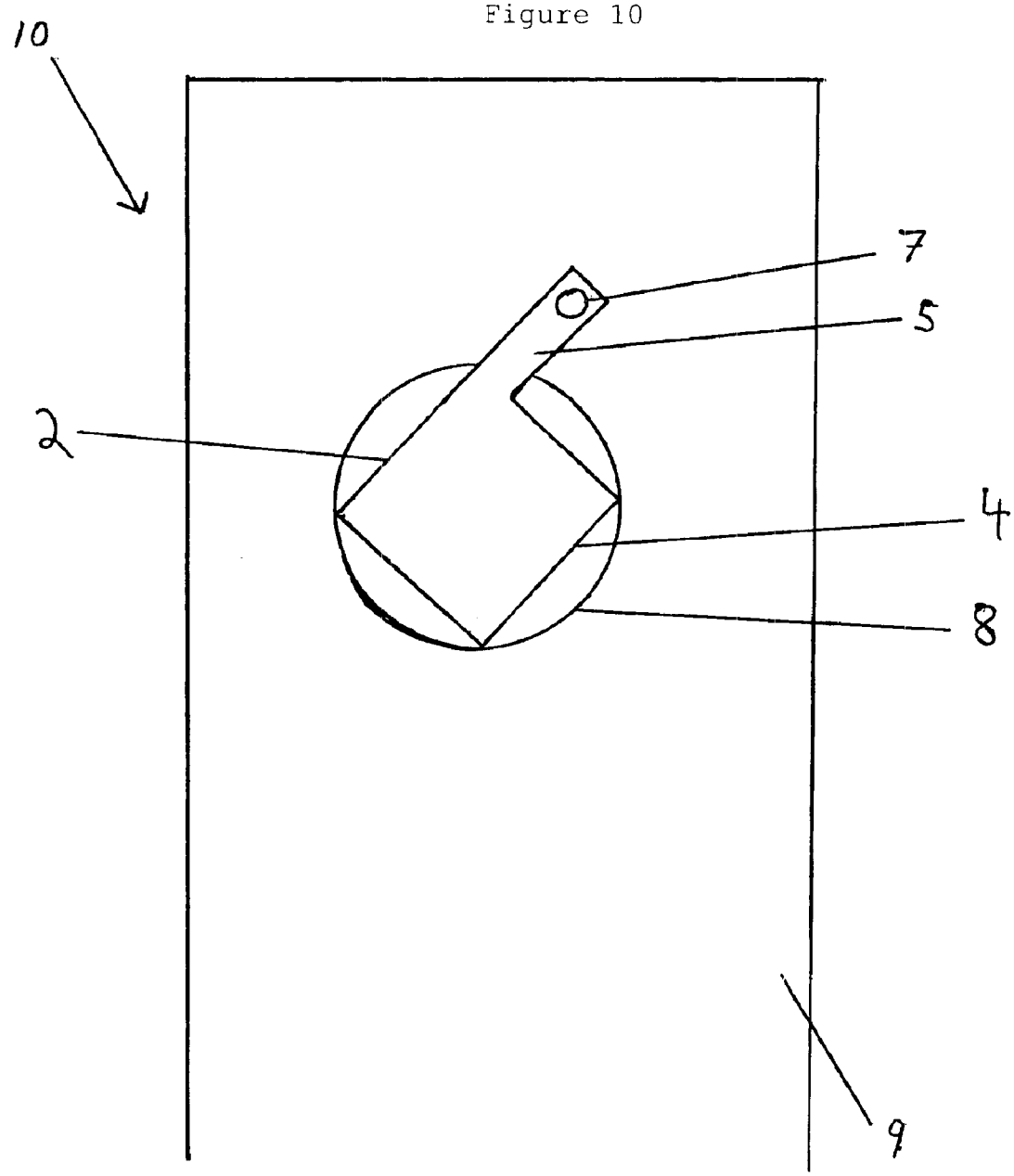
FIG. 10 is a Protector Sleeve with square/rectangular body, installed in wood stud, orientated such that it presents its corners horizontally (thus appearing diamond shaped) so as to deflect the nail or screw being driven horizontally into the stud.

The steel used for the body 4 should be at least, approximately, one sixteenth inches thick as this should be strong enough to withstand penetration, or substantial distortion, by a nail or screw. Since the Protector Sleeve 1 will hang, or rest, loosely in the drilled hole 8 in the stud 9, it will also serve its purpose by deflecting the nail or screw away from itself. Depending on the size of the drilled hole 8, as compared to the diameter of the Protector Sleeve's body 4, in any given situation there could be enough room in the hole 8 so that the nail or screw will deviate from its course when it hits the Protector Sleeve 1 rather than stopping. Just as a rock thrown against a wall at an angle will ricochet, whereas a rock thrown against a wall perpendicularly will stop, so too the Protector Sleeve 1 will deflect and divert the path of a nail or screw if the angles allow. In this regard the use of square tubing for the body 4 will be preferred. When made with square tubing, the body 4 of the Protector Sleeve 1 would have to be orientated during installation so as to present forty five degree angles to the parallel sides of the stud 9. (See FIG. 10.)

The Protector Sleeve 1 is installed by means of anchors 5 on both sides of its body 4. The anchors 5 are short strips of steel attached to the body 4 and projecting outward from the body's 4 ends. The shape of the anchors 5 would be rectangular and for a typical two inch by four inch stud 9 application would be one quarter to one half inches wide and one to two inches long. After the Protector Sleeve 1 has been placed in its hole 8, and the final anchor 5 is bent into place so that it is flush against the stud 9, the Protector Sleeve 1 will not be able to move out of the hole 8.

As described above, the anchors 5 are rectangular in shape if examined without regard to the body 4. One of the short sides of the rectangle is attached to the body 4. Near the end of the other short side there may be either a forty five degree notch, a triangularly tapered tip, or a triangular piece at a right angle, which would be bent ninety degrees away from the body 4 so as to form a barb 6. The barb 6 that would be thus formed would be embedded into the wood when the anchor 5 is bent or installed in its appropriate ninety degree fashion.

Alternatively, near the end of the anchor 5 there may be a hole 7, approximately one quarter inch in diameter, through which a nail or screw can be used to secure its position.

No matter which anchor 5 variation is used, (hole 7 for fastener, barb 6, or nothing) the Protector Sleeve 1 will be completely installed when, after insertion in the hole 8, both anchors 5 are bent ninety degrees and are against the wood. Bending the anchors 5 will only require a few hammer taps. If the anchor 5 is a spiked variety, then maybe an extra hammer tap will be necessary to fully embed the spike 6 into the wood. The Protector Sleeve 1 may come from the factory with one of its anchors 5 already bent ninety degrees. This may be done for the convenience of the installer but it might not be done if it adds substantial production or shipping costs.

Use of a barb 6, or a fastener through the fastener hole 7, is not mandatory because simply bending the anchors 5 flush against the wood will mean that the Protector Sleeve 1 will not work its way out of the hole 8 or move at all along its axis. The anchors 5 without barbs 6 or fasteners will secure the body 4 in its appropriate place by virtue of friction and the fact that its final shape, modified by the installation process, can not physically move out of the hole 8. Admittedly, without the barb 6 or fastener the Protector Sleeve 1 is capable of moving more freely within the hole 8 than when a barb 6 or fastener through the fastener hole 7 is used. However, this may be a desirable characteristic. If the Protector Sleeve 1 is capable of some movement within the hole 8 it will mean that if a nail or screw does strike it, the Protector Sleeve 1 will first shift position and, if eventually pinned against the hole 8 wall will present as obtuse an angle as possible and thereby deflect the nail or screw away from it more easily. The Protector Sleeve 1 secured by fasteners or barbs 6 in the anchors 5 will still usually deflect the nail or screw away but there may be situations where the nail or screw will strike at a right angle and then the Protector Sleeve 1 will only protect by virtue of being made of the harder material.

This new cylindrical version of the Protector Sleeve 1 can be made as a unit by performing sheet metal processing using an iron sheet, for example. It can also be made by creating a flat sheet in the shape of, or by cutting or stamping from an existing sheet, the form 3 and then rolling it into its cylindrical shape. The edges can be overlapped or butted together either at, or directly opposite, the anchors 5. Installing the cylindrical Protector Sleeve 1 will usually call for the anchors 5 to be secured vertically. Given a vertical anchor 5 installation there will be no chance of a nail or screw entering the seam or meeting place of the two ends.

For the square/rectangular embodiment 2, it can be formed by folding/bending flat sheet steel or it can be cut from a piece of square tube/pipe stock or made in the same metal processing manner.

The exact measurements will vary depending on the application and whatever any local building codes might require. Field or laboratory testing may reveal that something other than one sixteenth of an inch will be necessary or sufficient to withstand penetration or crushing by nails or screws and strong enough to deflect nails or screws away from and around it.

The initial and final anchors 5 should be seamlessly connected to the body 4 of the Protector Sleeve 1. Even though the initial anchor 5 and final anchor 5 are described separately they are intended to be part of the same continuous piece of steel.

Although the present invention has been described and illustrated in detail, it is clearly understood that the same is by way of illustration and example only and is not to be taken by way of limitation, the scope of the present invention being limited only by the terms of the appended claims.

What is claimed is:

1. I claim a cylindrical grommet comprised of a body having a first end and a second end, an initial anchor at said first end, and a final anchor at said second end, integrally formed as a unit, made of steel or a similarly hard material, that is inserted into a hole drilled through wood studs or joists, said body being substantially cylindrical and made of steel or a similarly hard material that is at least approximately one sixteenth inch thick, said body being at least as long as the depth of the drilled hole and which fits loosely within the drilled hole and which serves to protect from being punctured by nails or screws that might later be nailed or screwed into the wall where the stud or joist is, both and either by providing an impenetrable barrier around, and/or by deflecting the nail or screw from, the wire or pipe installed through the hole, said cylindrical grommet being anchored in place initially at said first end by said first anchor comprising one or more strips of steel or a similarly hard material which projects outward at a substantially right angle from the body, and said cylindrical grommet then finally being anchored on said second end by said second anchor comprising a strip of metal that is projected out from the second end of the cylindrical grommet and which, after initial anchoring, is bent away from the body to form a substantially right angle, and lay against the wood stud or joist, so that the final anchor is substantially perpendicular to the body, thus, when both said anchors have been secured in place the body of the invention will either be suspended, or will rest, inside the drilled hole.

2. The grommet as in claim 1 wherein the body is a square tube, rather than a cylindrical tube, and which is orientated within the drilled hole so as to present a corner/edge horizontally and thus deflect any nail or screw coming through the wood perpendicularly.

3. The grommet as in claim 1, or as in claim 2, wherein the initial anchor originally projects straight outward as the final anchor does, thus making the original and final anchors interchangeable and requiring that both be bent ninety degrees perpendicular to the body by the plumber or electrician installing it.

4. The grommet as in claims 1, 2, or 3, wherein said initial and final anchors secure the body in place not only by virtue of friction against the wood but also by means of one or more spikes/barbs or triangular teeth, approximately one quarter inch long, which dig or bite into the wood.

5. The grommet as in claim 4, which has holes in the initial and final anchors, rather than protruding spikes/barbs, which allow for the use of fasteners, such as a nail, screw or tack, to secure the anchors to the wood.

6. The grommet as in claim 4 having a tapered tip at the end of the anchors which is bent at a ninety degree angle to serve as the spike/barb.

7. The grommet as in claim 4 having the barb fashioned by means of cutting, at a roughly forty five degree angle, at or near the end of the anchor, a notch which will result in a triangular flap that should then be bent ninety degrees outward so as to serve as the spike/barb.

* * * * *